United States Patent Office 3,054,686
Patented Sept. 18, 1962

3,054,686
GLASS COMPOSITION HAVING HIGH CHEMICAL DURABILITY
Erwin C. Hagedorn, Oregon, Ohio, assignor to Owens-Illinois Glass Company, a corporation of Ohio
No Drawing. Filed May 18, 1960, Ser. No. 29,827
6 Claims. (Cl. 106—54)

This invention relates to glass compositions possessing higher chemical durability than normal soda-lime glasses and more specifically to modified borosilicate glasses which are particularly suitable for use in the manufacture of small glass containers for packaging pharmaceutical and/or biological drugs, solutions, and the like.

To be suitable for such purpose a glass should possess a relatively low softening point temperature without an excessively long working range and chemical durability and attendant stability which permit the satisfactory fabrication of such containers under conventional operating conditions. In particular, the glass should be one which is applicable to being drawn in tubular form by the apparatus and process set forth in Patent No. 1,219,709 to Danner, issued March 20, 1917, entitled "Apparatus for Forming Molten Material in Cylindrical Form," as well as by other known tube drawing processes. The glass should be able to withstand the elevated temperatures necessary for fabrication of the tubing without deleterious effects or deterioration of the glass surfaces as well as subsequent formation of a plurality of individual containers from lengthy sections of tubing.

The glass working range is conventionally known to be the temperature interval through which the glass is sufficiently plastic for forming to facilitate mechanical working of the glass into rod or tubular form. In practicing the Danner process to produce tubing it has been found that the log viscosity of the glass at the liquidus temperature should be at or near 5 on the logarithmic scale to avoid devitrification and other problems in continuous drawing of the glass from a rotary type mandrel. In making small glass containers such as vials, ampuls, medicinal bottles and the like from tubing, which containers are necessarily fabricated at relatively high temperatures and may also require sealing of an end portion thereof, the glass should be chemically and thermally durable and sufficiently stable to resist devitrification during subsequent reforming and treatment thereof without any substantial adverse effects thereupon. It is particularly imperative that the glass possess sufficient chemical durability to continue to resist in a satisfactory manner the solvent effect of water and other aqueous solutions such as an acidic media without being adversely affected even when stored for extensive periods. This is especially true where the container is to be utilized in packaging various pharmaceuticals, parenterals and biologicals for medicinal use.

Accordingly, it is an object of this invention to provide new and improved glass compositions possessing relatively low working temperatures and higher chemical durability than possessed by normal soda-lime glasses.

Another object of this invention is to provide modified borosilicate glasses which are applicable to being fabricated by drawing into tubular form by Danner or up-draw processes which glasses have a low liquidus temperature and good chemical durability.

Another object of the present invention is to provide novel glass compositions intermediate of conventional borosilicate and soda-lime compositions for containers for pharmaceutical use.

A further object of this invention is to provide high chemical durability glasses which possess relatively high viscosities at the liquidus temperature to facilitate forming by conventional drawing processes.

A still further object of this invention is to provide novel glass compositions that possess viscosities at their respective liquidus temperatures which are of the order of 5 on the logarithmic scale and are capable of being formed by continuous drawing and subsequent reworking operations without devitrification.

The specific nature of this invention as well as other objects and advantages thereof will become apparent to those skilled in the art from the following detailed description of the preferred embodiments of this invention.

It has been found that the subject glasses having relatively high viscosities at their individual liquidus temperatures are particularly useful for containers and may be termed modified borosilicate glasses. The subject glasses are based on the compositional range of about 67–71% $SiO_2$, 2.6–6.0% $Al_2O_3$, 2.0–5.0% $B_2O_3$, 6.0–10.0% CaO and MgO, 0–2.0% BaO, 10.5–14.5% $Na_2O$, 0.1–2.0% $K_2O$, 0–1.0% $Li_2O$, 0–0.2% $Cl_2$ and 0–0.2% $SO_3$ as calculated from the batch constituents, and such compositions exhibit melting and forming properties especially suitable for forming small glass containers. The subject glasses have properties of improved durability for retaining aqueous or other solutions when stored for considerable periods of time prior to usage of the contents. Generally, the glasses are herein defined as modified borosilicates which are intermediate of conventional higher-melting borosilicate glasses and lower-melting soda-lime glass and have properties of durability comparable to the former and working temperatures comparable to the latter.

The following table sets forth the ranges of constituents of the subject glasses and limits of physical properties. The glasses have a liquidus temperature less than about 960° C. (1760° F.) and preferably between 885°–954° C. (1625°–1750° F.)

Table I

Theoretical composition:
| | |
|---|---|
| $SiO_2$ _____percent__ | 67–71 |
| $Al_2O_3$ _____do____ | 2.5–6.0 |
| $B_2O_3$ _____do____ | 2.0–5.0 |
| CaO+MgO _____do____ | 6.0–10.0 |
| BaO _____do____ | 0–2.0 |
| $Na_2O$ _____do____ | 10.5–14.5 |
| $K_2O$ _____do____ | 0.1–2.0 |
| $Li_2O$ _____do____ | 0–1.0 |
| Cl _____do____ | 0–0.2 |
| $SO_3$ _____do____ | 0–0.2 |

Physical properties:
Liquidus temperature—
| | |
|---|---|
| ° F. | 1626–1750 |
| ° C. | 885–954 |

Log viscosity at the liquidus temperature____ 4.5–5.5
Log viscosity at ° F.—
| | |
|---|---|
| 3 | 2100–2300 |
| 7 | 1370–1440 |

Thermal expansion $\alpha \times 10^{-7}$ cm. per cm. per ° C. (0–300° C.) _____ 74–85

Chemical durability:
| | |
|---|---|
| $H_2O$ test (crushed sample) (percent dissolved $Na_2O$) | 0.006–0.019 |
| 0.02 N $H_2SO_4$ (crushed sample) (percent dissolved $Na_2O$) | 0.012–0.025 |
| U.S.P. (XVI) Type I (ml. 0.02 N. $H_2SO_4$) | 1.7–5.0 |

Batch constituents for preparing six typical examples of the subject glasses are set forth in the following table. Also included are compositional analyses on an oxide basis of the subject final heat-reacted glasses as calculated from the batch and individual physical properties of the glasses according to the invention. Other batch constituents for producing the indicated compositions may be substituted as necessary or desired to obtain the prescribed chemical analyses of the glasses.

*Table II*

BATCH CONSTITUENTS

[Lbs. required per ton of glass]

|  | 1 | 2 | 3 | 4 | 5 | 6 |
|---|---|---|---|---|---|---|
| Sand | 1,137.5 | 1,128.7 | 1,131.7 | 1,129.1 | 1,139.1 | 1,224.9 |
| Lime (Calcite) | 52.2 | 52.3 | 51.7 | 53.1 | 53.1 |  |
| Lime (Dolomite) | 117.7 | 121.7 | 116.6 | 121.7 | 121.7 | 186.8 |
| Borax (Dehydrated) | 116.7 | 127.1 | 115.6 | 117.6 | 96.9 | 117.9 |
| Soda Ash | 216.2 | 255.1 | 231.5 | 291.1 | 308.7 | 384.4 |
| Nepheline Syenite | 444.7 | 438.3 | 440.5 | 438.3 | 438.3 | 244.5 |
| Barytes |  | 22.7 |  |  |  | 19.4 |
| Niter | 12.5 | 12.5 | 12.5 | 12.5 | 12.5 |  |
| Sodium Chloride | 6.0 |  | 6.0 | 6.0 | 6.0 |  |
| Potash (Calcined) | 7.7 |  | 7.7 |  |  |  |
| Barium Carbonate | 20.1 |  | 19.8 |  |  |  |
| Lithium Carbonate | 15.0 |  |  |  |  |  |

THEORETICAL COMPOSITION

[Percent of resultant glasses]

|  | 1 | 2 | 3 | 4 | 5 | 6 |
|---|---|---|---|---|---|---|
| $SiO_2$ | 70.35 | 69.65 | 69.93 | 69.82 | 70.32 | 68.75 |
| $Al_2O_3$ | 5.24 | 5.12 | 5.19 | 5.17 | 5.17 | 2.79 |
| $B_2O_3$ | 3.94 | 4.08 | 3.90 | 3.77 | 3.07 | 3.60 |
| $CaO$ | 4.95 | 5.08 | 4.90 | 5.08 | 5.08 | 5.74 |
| $MgO$ | 2.48 | 2.44 | 2.46 | 2.38 | 2.38 | 3.76 |
| $BaO$ | 0.78 | 0.76 | 0.77 |  |  | 0.66 |
| $Na_2O$ | 10.60 | 11.75 | 11.50 | 12.74 | 12.94 | 14.03 |
| $K_2O$ | 1.22 | 0.94 | 1.21 | 0.90 | 0.90 | 0.49 |
| $Li_2O$ | 0.30 |  |  |  |  |  |
| $Cl$ | 0.18 |  | 0.18 | 0.18 | 0.18 |  |
| $-O_2 \circ Cl$ | -0.04 |  | -0.04 | -0.04 | -0.04 |  |
| $SO_3$ |  | 0.18 |  |  |  | 0.18 |
| Total | 100.00 | 100.00 | 100.00 | 100.00 | 100.00 | 100.00 |

PHYSICAL PROPERTIES

|  | 1 | 2 | 3 | 4 | 5 | 6 |
|---|---|---|---|---|---|---|
| Liquidus Temp.: |  |  |  |  |  |  |
| ° F | 1,690 | 1,695 | 1,655 | 1,635 | 1,635 | 1,705 |
| ° C | 921 | 924 | 902 | 890 | 890 | 930 |
| Log Viscosity at the Liquidus Temp | 5.0 | 5.1 | 5.3 | 5.4 | 5.4 | 4.6 |
| Log Viscosity at ° F.: |  |  |  |  |  |  |
| 3 | 2,220 | 2,280 | 2,240 | 2,255 | 2,275 | 2,125 |
| 7 | 1,407 | 1,433 | 1,429 | 1,431 | 1,433 | 1,375 |
| Thermal Expansion $\alpha \times 10^{-7}$ (0°–300° C.) | 77.0 | 75.2 | 77.7 | 83.4 | 83.8 | 83.4 |

CHEMICAL DURABILITY

|  | 1 | 2 | 3 | 4 | 5 | 6 |
|---|---|---|---|---|---|---|
| $H_2O$ Test (crushed sample) | 0.006 | 0.007 | 0.007 | 0.009 | 0.010 | 0.018 |
| 0.02 N $H_2SO_4$ (crushed sample) | 0.012 | 0.013 | 0.014 | 0.015 | 0.016 | 0.025 |
| USP (XVI) Type I | 1.70 | 1.97 | 2.26 | 2.80 | 3.10 | 4.90 |

The compositional analyses listed above are given for the final glasses produced by melting and refining of the respective individual batches designated as Examples 1 to 6.

Example No. 3 indicates a preferred composition according to the invention wherein the glass exhibits good working properties and especially advantageous chemical resistance as indicated by its durability tests and the production of a considerable quantity of light-weight vials fabricated from tubing and their use for containing pharmaceutical products. Example No. 1 contains lithium oxide while Example Nos. 4 and 5 indicate comparable compositions which contains neither lithium nor barium oxides. Examples 1, 3, 4 and 5 are refined by the inclusion of chlorine in these melts and Examples 2 and 6 by sulfates. All of the subject glasses have coefficients of thermal expansion (0–300° C.) ranging from $74 \times 10^{-7}$ to $85 \times 10^{-7}$ cm. per cm. per ° C. and a liquidus temperature of less than 960° C. The compositions are useful for small sizes of vials such as those having a volume of the order of 10 ml. or less.

The U.S.P. XVI Type I test for chemical resistance is set forth in detail in U.S. Pharmacopoeia on pages 918–920. This Sixteenth Revision of the U.S.P. becomes official on October 1, 1960, for prescribing a standard test of resistance to water attack of newly-formed glass containers. The degree of attack is determined by the amount of alkali released from the glass under the influence of the attacking medium under the conditions specified. This quantity of alkali is extremely small in the case of the more resistant glasses thus calling for particular attention to all details of the test. The subject glasses have limits of resistance suitable for packaging pharmacopoeia classed as Types I, II and III. Briefly stated, the chemical durability of the glass upon extracting 10 grams of crushed sample with 50 ml. of water in an autoclave at 121° C. for 30 minutes is less than 5.0 ml. of 0.02 normal sulfuric acid to neutralize the extract.

The water and 0.02 normal sulphuric acid crushed sample tests listed above under chemical durability are additional tests which measure the resistance of glass to water or to dilute acid under prescribed conditions. The amount of material dissolved in these media is titrated with acid or base and the amount of material thus found to have been extracted from the glass sample is reported as percent $Na_2O$ dissolved. The glass sample consists of freshly-crushed washed glass grains which have been caught between limiting sieves. The surface area presented by the sample of prescribed weight is dependent upon the sieve size and what is measured is the amount of alkali leached from a controlled area of freshly-fractured glass surface. The test of 0.02 normal $H_2SO_4$ as the extracting medium in a crushed sample test is identical with the former U.S.P. XIII Type III specification test except that the result is expressed in units of percent $Na_2O$ dissolved.

A 10 gram sample of crushed glass which has been collected between U.S. sieve numbers 20 and 40 from a 100 gram piece of cullet crushed by hand is taken for the test. Fifty milliliters of the attacking medium either purified water, 0.02 normal $H_2SO_4$, or 0.001 normal $H_2SO_4$ is introduced into a flask along with the prepared sample. The flask is immersed in a constant temperature bath at 90° plus or minus 0.2° C. and retained thereat for four hours. After the contents of the flask are cooled, exactly 40 ml. of the extract solution is taken for titration with 0.02 normal $H_2SO_4$ to an excess of 0.10 ml. The solution is back-titrated with 0.02 normal NaOH and the percentage of $Na_2O$ dissolved is calculated from the results of the titrations. A generally similar procedure is followed for each of the different attacking mediums.

Various modifications may be resorted to within the spirit and scope of the appended claims.

I claim:

1. A glass composition suitable for forming by drawing processes consisting essentially of 67–71% $SiO_2$, 2.5–6.0% $Al_2O_3$, 2.0–5.0% $B_2O_3$, 6.0–10.0% CaO and MgO, 0.–2.0% BaO, 10.5–14.5% $Na_2O$, 0.1–2.0% $K_2O$, 0–1.0% $Li_2O$, 0–0.2% $Cl_2$, and 0–0.2% $SO_3$.

2. A glass composition consisting essentially of 67–71% $SiO_2$, 2.5–6.0% $Al_2O_3$, 2.0–5.0% $B_2O_3$, 6.0–10.0% CaO and MgO, 0–2.0% BaO, 10.5–14.5% $Na_2O$, 0.1–2.0% $K_2O$, 0–1.0% $Li_2O$, 0–0.2% $Cl_2$, and 0–0.2% $SO_3$ the thermal expansion coefficient of the glass being from $74 \times 10^{-7}$ to $85 \times 10^{-7}$ cm. per cm. per degree C. between 0° and 300° C., the liquidus temperature ranging from about 885°–954° C., the log viscosity at the liquidus temperature ranging from 4.5 to 5.5, and the chemical durability of the glass upon extracting 10 grams of crushed sample with 50 ml. of $H_2O$ in an autoclave at 121° C. for 30 minutes being less than 5.0 ml. of 0.02 normal sulfuric acid to neutralize the extract.

3. A glass composition suitable for forming by continuous drawing which consists essentially of 69.93% $SiO_2$, 5.19% $Al_2O_3$, 3.90% $B_2O_3$, 4.90% CaO, 2.46% MgO, 0.77% BaO, 11.50% $Na_2O$, 1.21% $K_2O$, and 0.18% $Cl_2$, as calculated from the batch.

4. A glass composition suitable for forming by continuous drawing consisting of approximately 69.93% $SiO_2$, 5.19% $Al_2O_3$, 3.90% $B_2O_3$, 4.90% CaO, 2.46% MgO, 0.77% BaO, 11.50% $Na_2O$, 1.21% $K_2O$, and 0.18% $Cl_2$, the said glass having a liquidus temperature of about 902° C., a log viscosity at the liquidus temperature of about 5.3, and a coefficient of thermal expansion of about $$77.7 \times 10^{-7}$$

cm. per cm. per ° C. over the range of 0–300° C.

5. A glass suitable for forming by drawing processes and having high chemical durability having approximately the following final composition by weight:

| | Percent |
|---|---|
| Silica ($SiO_2$) | 69.93 |
| Alumina ($Al_2O_3$) | 5.19 |
| Boric oxide ($B_2O_3$) | 3.90 |
| Calcium oxide (CaO) | 4.90 |
| Magnesium oxide (MgO) | 2.46 |
| Barium oxide (BaO) | 0.77 |
| Sodium oxide ($Na_2O$) | 11.50 |
| Potassium oxide ($K_2O$) | 1.21 |
| Chlorine ($Cl_2$) | 0.18 |
| —$O_2$ equivalent | —0.04 |
| Total | 100.00 | said glass having a liquidus temperature of approximately 902° C., a log viscosity at the liquidus temperature of about 5.3, a thermal expansion coefficient of approximately $77.7 \times 10^{-7}$ cm. per cm. per ° C., and a chemical durability for the U.S.P. XVI Type I test of about 2.26 ml. of 0.02 normal sulfuric acid.

6. A glass suitable for forming by drawing processes and having high chemical durability having approximately the following final composition by weight:

| | Percent |
|---|---|
| Silica ($SiO_2$) | 69.82 |
| Alumina ($Al_2O_3$) | 5.17 |
| Boric oxide ($B_2O_3$) | 3.77 |
| Calcium oxide (CaO) | 5.08 |
| Magnesium oxide (MgO) | 2.38 |
| Sodium oxide ($Na_2O$) | 12.74 |
| Potassium oxide ($K_2O$) | 0.90 |
| Chlorine ($Cl_2$) | 0.18 |
| —$O_2$ equivalent | —0.04 |
| Total | 100.00 | said glass having a liquidus temperature of approximately 890° C., a log viscosity at the liquidus temperature of about 5.4, a thermal expansion coefficient of approximately 83.4 cm. per cm. per ° C., and a chemical durability for the U.S.P. XVI Type I test of about 2.80 ml. of 0.02 normal sulfuric acid.

References Cited in the file of this patent

UNITED STATES PATENTS

| | | |
|---|---|---|
| 2,001,504 | Schmidt | May 14, 1935 |
| 2,262,951 | Lyle | Nov. 18, 1941 |
| 2,323,643 | Barton | July 6, 1943 |
| 2,443,142 | Lyle | June 8, 1948 |
| 2,527,693 | Armistead | Oct. 31, 1950 |
| 2,552,495 | Poole | May 8, 1951 |
| 2,582,852 | Shoemaker | Jan. 15, 1952 |
| 2,756,158 | Hahn et al. | July 24, 1956 |